United States Patent
Samadani et al.

(10) Patent No.: US 7,941,002 B2
(45) Date of Patent: May 10, 2011

(54) APPARATUS AND METHODS OF PRODUCING PHOTOREALISTIC IMAGE THUMBNAILS

(75) Inventors: Ramin Samadani, Menlo Park, CA (US); Suk Hwan Lim, San Mateo, CA (US); Daniel R. Tretter, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1194 days.

(21) Appl. No.: 11/607,181

(22) Filed: Dec. 1, 2006

(65) Prior Publication Data

US 2008/0134094 A1    Jun. 5, 2008

(51) Int. Cl.
| | |
|---|---|
| G06K 9/00 | (2006.01) |
| G06K 9/34 | (2006.01) |
| G06K 9/46 | (2006.01) |
| G06K 9/66 | (2006.01) |
| G06K 9/40 | (2006.01) |
| G06K 9/32 | (2006.01) |
| G06K 9/54 | (2006.01) |
| G06K 9/60 | (2006.01) |
| H04N 9/47 | (2006.01) |
| H04N 7/18 | (2006.01) |
| G06F 17/28 | (2006.01) |
| G06F 17/27 | (2006.01) |
| G06F 17/26 | (2006.01) |
| G06F 17/25 | (2006.01) |
| G06F 17/24 | (2006.01) |
| G06F 17/22 | (2006.01) |
| G06F 17/21 | (2006.01) |
| G06F 17/20 | (2006.01) |
| G06F 17/00 | (2006.01) |
| G06F 3/048 | (2006.01) |
| H04N 5/262 | (2006.01) |
| H04N 5/222 | (2006.01) |
| H04N 5/44 | (2006.01) |

(52) U.S. Cl. ........ 382/298; 382/100; 382/173; 382/190; 382/260; 382/300; 382/305; 348/240.2; 348/333.05; 348/63; 348/561; 715/277; 715/838

(58) Field of Classification Search .................. 382/100, 382/173, 181, 276, 282–283, 305, 260, 293–301; 384/222.1; 348/222.1, 240, 333.01–333.05, 348/358; 715/252, 273, 277, 764, 781, 838
See application file for complete search history.

(56) References Cited

U.S. PATENT DOCUMENTS 6,148,117 A * 11/2000 Lopez et al. .................. 382/279
(Continued)

FOREIGN PATENT DOCUMENTS

KR    10-2001-0049006 A    6/2001
(Continued)

OTHER PUBLICATIONS

Robert L. Cook, "Stochastic Sampling in Computer Graphics," ACM Transactions on Graphics (TOG), vol. 5, Issue 1, pp. 51-72 (Jan. 1986).

(Continued)

Primary Examiner — Anand Bhatnagar
Assistant Examiner — Nathan Bloom (57) ABSTRACT

Methods, systems, and machine-readable media for processing an input image are described. In one aspect, respective visual features of local input image regions of an input image having a first pixel resolution are analyzed to produce a result. Based on the result of analyzing the visual features, reduced-resolution visual representations of corresponding ones of the local input image regions are derived from the input image. A thumbnail image that reflects the arrangements, proportions and local details of the input image having a second pixel resolution lower than the first pixel resolution is produced from the reduced-resolution visual representations. The thumbnail image is output.

20 Claims, 8 Drawing Sheets

U.S. PATENT DOCUMENTS

| | | | |
|---|---|---|---|
| 6,272,484 B1 | 8/2001 | Martin et al. | |
| 6,404,901 B1* | 6/2002 | Itokawa | 382/103 |
| 6,512,855 B1* | 1/2003 | Delean | 382/276 |
| 6,563,959 B1 | 5/2003 | Troyanker | |
| 7,069,506 B2 | 6/2006 | Rosenholtz et al. | |
| 2002/0048413 A1 | 4/2002 | Kusunoki | |
| 2002/0129114 A1 | 9/2002 | Sundaresan et al. | |
| 2002/0135621 A1* | 9/2002 | Angiulo et al. | 345/838 |
| 2003/0009493 A1 | 1/2003 | Parker et al. | |
| 2003/0026495 A1* | 2/2003 | Gondek et al. | 382/261 |
| 2003/0026504 A1* | 2/2003 | Atkins et al. | 382/300 |
| 2003/0113017 A1* | 6/2003 | Thomas et al. | 382/181 |
| 2004/0003351 A1 | 1/2004 | Sommerer et al. | |
| 2004/0126021 A1* | 7/2004 | Sull et al. | 382/233 |
| 2005/0008257 A1 | 1/2005 | Tsukihara | |
| 2005/0047655 A1* | 3/2005 | Luo et al. | 382/167 |
| 2005/0047659 A1 | 3/2005 | Tanaka | |
| 2005/0180658 A1* | 8/2005 | Curry et al. | 382/300 |
| 2006/0120599 A1 | 6/2006 | Steinberg et al. | |
| 2006/0158682 A1 | 7/2006 | Atsumi et al. | |
| 2006/0177151 A1* | 8/2006 | Miyazawa et al. | 382/298 |
| 2006/0177152 A1 | 8/2006 | Lin et al. | |
| 2006/0224997 A1 | 10/2006 | Wong et al. | |
| 2006/0257048 A1* | 11/2006 | Lin et al. | 382/276 |
| 2007/0047841 A1* | 3/2007 | Berkner et al. | 382/298 |
| 2007/0165964 A1* | 7/2007 | Wolf et al. | 382/276 |
| 2007/0196027 A1 | 8/2007 | Lin et al. | |
| 2008/0037881 A1* | 2/2008 | Murashita et al. | 382/232 |

FOREIGN PATENT DOCUMENTS

| | | |
|---|---|---|
| KR | 10-2001-0078707 A | 8/2001 |
| KR | 10-2003-0005554 A | 1/2003 |
| KR | 10-2005-0108365 A | 11/2005 |
| KR | 10-2006-0025400 A | 3/2006 |

OTHER PUBLICATIONS

Vidya Setlur et al., "Automatic Image Retargeting," NWU-CS Techical Report, NWU-CS-04-41, (Aug. 5, 2004).

Li-Qun Chen et al., "A visual attention model for adapting images on small displays," Multimedia Systems (2003).

Bongwon Suh et al., "Automatic thumbnail cropping and its effectiveness," ACM Conference on User Interface and Software Technolgy (UIST 2003), pp. 95-104 (2003).

Doug DeCarlo et al., "Sylization and abstraction of photographs," SIGGRAPH 2002, pp. 1-8 (2002).

David L. Donoho, "Wavelet Shrinkage and W.V.D.: A 10-Minute Tour," Technical Report, Stanford University, pp. 1-27 (1992).

* cited by examiner

APPARATUS AND METHODS OF PRODUCING PHOTOREALISTIC IMAGE THUMBNAILS

BACKGROUND

Although thumbnail images enable users to quickly browse many images, the process of reducing the size of an original image to produce a thumbnail image typically removes local features of the original image. As a result, the appearance of a thumbnail image oftentimes does not reveal the contents or quality of the corresponding original image, making browsing with standard thumbnails error-prone and inefficient.

Some visual search approaches address this problem by synthesizing non-photorealistic thumbnails that enhance the visibility of selected features of the original images. In one such approach, non-salient regions (e.g., the background regions) are cropped from an original image and a thumbnail image is produced from the resulting cropped regions. In another approach, a thumbnail version of an original image is generated with selected "relevant" elements that are emphasized (e.g., larger or bolder font and more saturated colorfulness) in relation to other elements to provide cues that aid the user in identifying or classifying the original image.

What are needed are apparatus and methods of producing photorealistic image thumbnails that provide improved representations of the quality of the corresponding original images.

SUMMARY

The invention features methods, systems, and machine-readable media for processing an input image.

In one aspect of the invention, respective visual features of local input image regions of an input image having a first pixel resolution are analyzed to produce a result. Based on the result of analyzing the visual features, reduced-resolution visual representations of corresponding ones of the local input image regions are derived from the input image. A thumbnail image that reflects the arrangements, proportions and local details of the input image having a second pixel resolution lower than the first pixel resolution is produced from the reduced-resolution visual representations. The thumbnail image is output.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Introduction

The embodiments that are described in detail below are capable of producing photorealistic image thumbnails that provide improved representations of the quality of the corresponding original images. In this way, these embodiments enable users to accurately ascertain the quality of the original images. This information may be used, for example, to select which images in a collection to incorporate into a photo album, print as a hardcopy, send to others by electronic mail, and delete from a collection.

As used herein, the term "photorealistic thumbnail image" refers to a reduced-resolution version of an input image that reflects the arrangement, proportions, and local details of the corresponding input image. The photorealistic thumbnail images may contain either reproduced or synthesized elements that subjectively convey the visual appearance of the different visual elements of the corresponding input image without necessarily objectively reproducing the high resolution visual elements. In contrast, a "non-photorealistic thumbnail image" refers to a reduced-resolution version of an input image that purposefully and stylistically modifies local details of visual elements of the input image to focus the viewer's attention in a way that communicates information.

Figure 1:
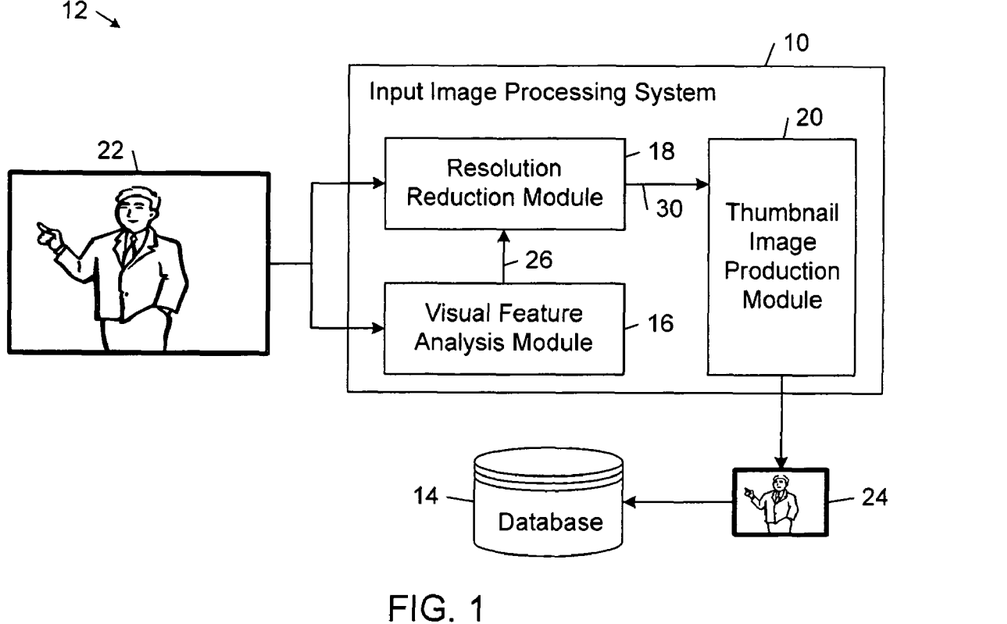
FIG. 1 is a block diagram of an embodiment of an input image processing system in an exemplary application environment.

II. Overview of an Input Image Processing System in an Exemplary Application Environment FIG. 1 shows an embodiment of an input image processing system 10 in an exemplary application environment 12 that includes a database 14. The input image processing system 10 includes a visual feature analysis module 16, a resolution reduction module 18, and a thumbnail image production module 20. In operation, the input image processing system 10 processes an input image 22 to produce a thumbnail image 24, which is output (e.g., stored in the database 14 on a non-volatile computer-readable medium, stored on a volatile computer-readable medium, rendered on a display, or rendered on a print medium, such as paper).

The input image processing system 10 may be implemented by one or more discrete modules (or data processing components) that are not limited to any particular hardware, firmware, or software configuration. In the illustrated embodiment, the modules 16-20 may be implemented in any computing or data processing environment, including in digital electronic circuitry (e.g., an application-specific integrated circuit, such as a digital signal processor (DSP)) or in computer hardware, firmware, device driver, or software. In some embodiments, the functionalities of multiple ones of the modules 16-20 are combined into a single processing component. In some embodiments, the respective functionalities of each of one or more of the modules 16-20 are performed by a respective set of multiple processing components. In some implementations, computer process instructions for implementing the methods that are executed by the input image processing system 10, as well as the data it generates, are stored in one or more machine-readable media. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM.

Figure 2:
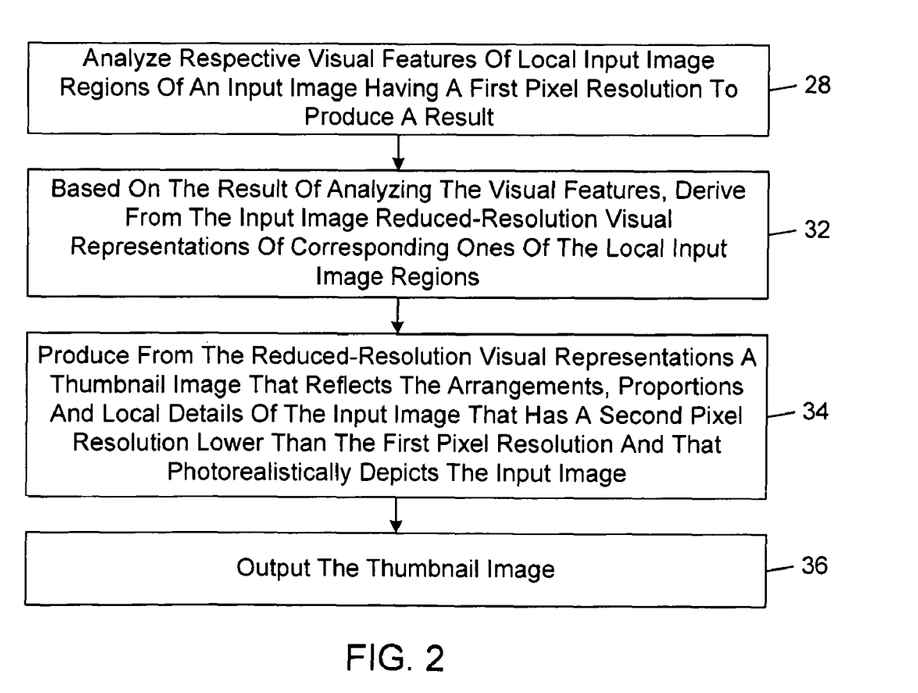
FIG. 2 is a flow diagram of an embodiment of an input image processing method.

FIG. 2 shows an embodiment of a method that is implemented by the input image processing system 10.

In accordance with this method, the visual feature analysis module 16 analyzes respective visual features 26 of local input image regions of the input image 22 to produce a result (FIG. 2, block 28). In general, the result of analyzing the visual features may be values of parameters characterizing, measuring, or specifying one or more visual properties or attributes (e.g., amounts or levels of blur, noise, texture, colorfulness, or specular highlights) of the local input image regions or the result may be models representing such visual properties or attributes of the local input image regions.

The input image 22 is characterized by a first pixel resolution. As used herein, the "pixel resolution" refers to a count of the pixels in the digital image. The pixel count may be expressed, for example, as a total pixel count or as a product of the horizontal and vertical dimensions of the array of pixels corresponding to the digital image. In general, the input image 22 may correspond to any type of digital image, including an original image (e.g., a video keyframe, a still image, or a scanned image) that was captured by an image sensor (e.g., a digital video camera, a digital still image camera, or an optical scanner) or a processed (e.g., sub-sampled, filtered, reformatted, enhanced or otherwise modified) version of such an original image. Alternately, the input image 22 may correspond to artificially generated images synthesized from computer graphics models using ray-tracing or any other image generation techniques. These synthetic images may be used, for example, to generate special effects movie frames, computer game visuals and other artificial images.

Based on the result of analyzing the visual features 26, the resolution reduction module 18 derives from the input image 22 reduced-resolution visual representations 30 of corresponding ones of the local input image regions (FIG. 2, block 32). The reduced-resolution visual representations 30 typically model one or more visual feature in corresponding ones of the local input image regions. In some cases, these models correspond to the combination of the visual features and an underlying image representation. In other cases, these models correspond to a representation of the visual features themselves, in which case they typically are specified as perturbations or modifications that are to be combined with an underlying reduced-resolution representation of the input image 22.

The thumbnail image production module 20 produces the thumbnail image 24 from the reduced-resolution visual representations 30 (FIG. 2, block 34). The thumbnail image 24 has a pixel resolution that is lower than the pixel resolution of the input image 22. The thumbnail image 14 reflects the arrangement, proportions and local details of the input image 22.

The thumbnail image production module 20 outputs the thumbnail image 24 (FIG. 2, block 36). For example, in some embodiments the thumbnail image production module 20 outputs the thumbnail image 24 by storing at least a portion of the thumbnail image 24 on a machine-readable data storage medium. The machine-readable data storage medium typically is an electronic memory device, such as a computer-readable storage medium. In some embodiments, the thumbnail image production module 20 stores the entire thumbnail image 24 in the machine readable data storage medium at one time. In other embodiments, the thumbnail image production module 20 stores the thumbnail image 24 in the machine readable data storage medium on a line-by-line basis in order to meet the constraints imposed by embedded environments, such as embedded printer environments in which one or both of the processing resources and the memory resources are severely constrained. In some embodiments, thumbnail image production module 20 outputs the thumbnail image 24 by rendering the thumbnail image 24. For example, in some embodiments, the thumbnail image production module 20 renders the thumbnail image 24 on a display. The display may be, for example, a flat panel display, such as a LCD (liquid crystal display), a plasma display, an EL display (electroluminescent display) and a FED (field emission display). In other embodiments, the thumbnail image production module 20 renders the thumbnail image 24 on a print medium (e.g., a sheet of paper).

III. Exemplary Embodiments of the Input Image Processing System

The visual features of the local input image regions that are analyzed by the visual feature analysis module 16 correspond to one or more visual properties or attributes of the input image 22. In some embodiments, the input image processing system 10 processes the input image 22 through a single processing pipeline that simultaneously analyzes multiple visual properties or attributes of the input image 22 and derives the reduced-resolution visual representations of the local input image regions from the results of analyzing the visual properties or attributes. In other embodiments, the input image processing system 10 processes the input image 22 through a separate processing pipeline for each visual property or attribute.

Figure 3:
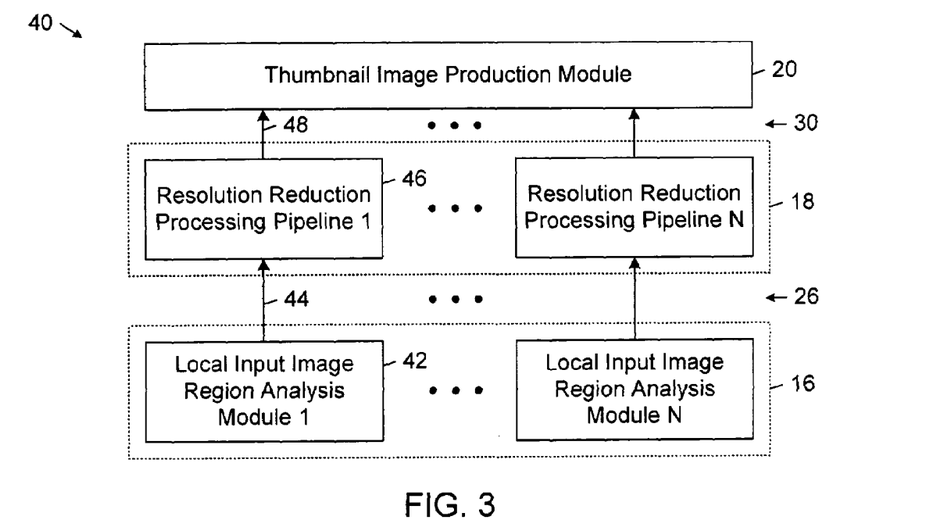
FIG. 3 is a block diagram of an embodiment of the input image processing system shown in FIG. 1.

FIG. 3 shows an embodiment 40 of the input image processing system 10 in which the visual feature analysis module 16 includes N local input image region analysis modules 42 (N has an integer value of at least two), each of which produces a respective result 44 of analyzing a respective visual property or attribute of the local input image regions. The input image processing system 40 also includes N resolution reduction processing pipelines 46, each of which derives a respective set 48 of reduced-resolution visual representations from the corresponding results 44 of analyzing the visual features of the local input image regions. In some embodiments, each set 48 of the reduced-resolution visual representations is passed to the thumbnail image production module 20 in the form of a composite reduced-resolution image or map. In other embodiments, the reduced-resolution visual representations are passed to the thumbnail image production module as separate and discrete sub-images or sub-maps respectively corresponding to individual ones of the local input image regions.

Figure 4:
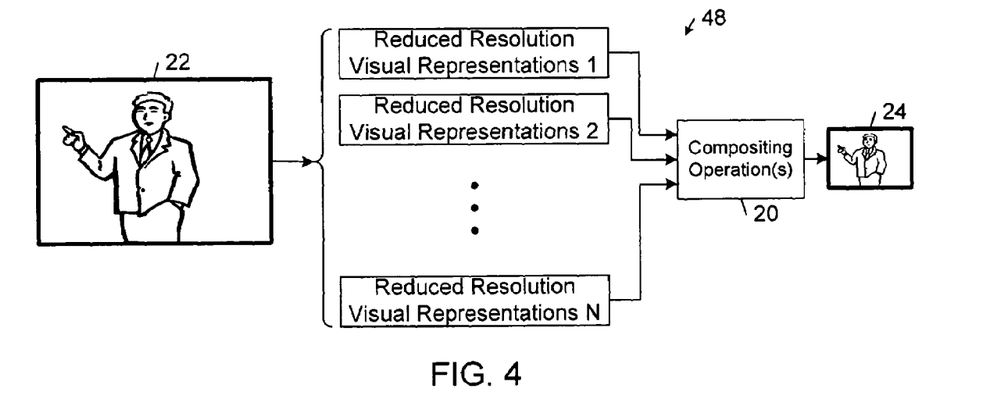
FIG. 4 is a flow diagram of information produced by an embodiment of the input image processing system shown in FIG. 3.

FIG. 4 shows a flow diagram of information that is produced by the input image processing system 40 at various stages during an embodiment of a process of producing the thumbnail image 24 from the input image 22. In accordance with this process, each of the resolution reduction processing pipelines 46 derives a respective set 48 of reduced-resolution visual representations of the local input image regions from the results 44 of analyzing the visual features of the local input image regions. The resolution reduction processing pipelines 46 passes the sets 48 of reduced-resolution visual representations to the thumbnail image production module 20, which combines the sets 48 of reduced-resolution visual representations to produce the thumbnail image 24. In this process, the thumbnail image production module 20 may use one or more compositing operations (e.g., one or more of an overlay compositing operation and an addition compositing operation). Additional details regarding the types of compositing operations that may be used by the image production module 20 to combine the sets 48 of reduced-resolution visual representations can be found in Porter and Duff, "Compositing Digital Images," Computer Graphics, Vol. 18, No. 3, pp. 253-259 (July 1984).

IV. Exemplary Embodiments of the Components of the Input Image Processing System As explained above, embodiments of the input image processing system 10 are capable of producing the thumbnail image 24 from reduced-resolution visual representations that model visual features corresponding to one or more visual properties or attributes of the local regions of the input image 22. Exemplary visual properties or attributes that are modeled by the input image processing system 10 include, but are not limited to, blur, noise, texture, colorfulness, and specular highlights.

A. Modeling Blur in Local Input Image Regions

Figure 5:
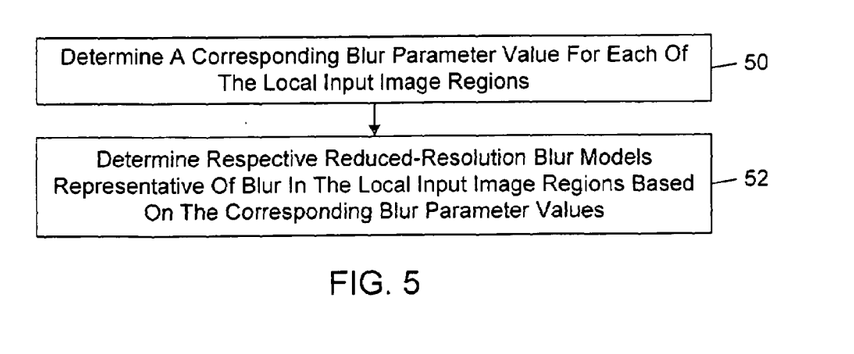
FIG. 5 is a flow diagram of an embodiment of an input image processing method.

FIG. 5 shows an embodiment of a method by which the input image processing system 10 models blur in local regions of the input image 22.

In accordance with the blur modeling method of FIG. 5, the visual feature analysis module 16 determines a corresponding blur parameter value for each of the local input image regions (FIG. 5, block 50). In some embodiments, the blur parameter values are correlated with the amount of blur in the local input image regions in accordance with a particular model or visual representation of the blur in local input image regions. In other embodiments, the blur parameter values provide a direct or indirect measure of the amount of blur in the local input image regions in accordance with a particular model or visual representation of the blur in local input image regions.

The resolution reduction module 18 determines respective reduced-resolution blur models that are representative of blur in the local input image regions based on the corresponding blur parameter values (FIG. 5, block 52). In some embodiments, the blur models correspond to respective regions of a reduced-resolution base image that are blurred by respective amounts that are determined by the corresponding blur parameter values. In other embodiments, the blur models correspond to downsampled versions of the local input image regions that are filtered by respective blur filters, where the amount of blur produced by the blur filters is set by the corresponding blur parameter values.

In some embodiments, the thumbnail image production module 20 may synthesize the thumbnail image 24 from the reduced-resolution blur models, each of which corresponds to a respective local region of the thumbnail image 24.

Figure 6:
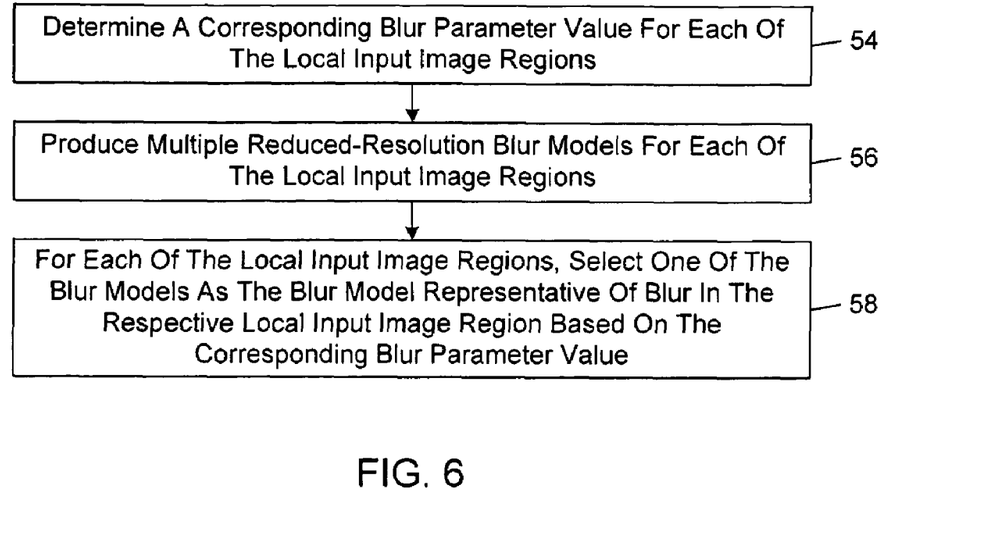
FIG. 6 is a flow diagram of an embodiment of the input image processing method of FIG. 5.

FIG. 6 shows an exemplary implementation of the blur modeling method of FIG. 5. In accordance with this method, the visual feature analysis module 16 determines a corresponding blur parameter value for each of the local input image regions (FIG. 6, block 54). In this method, the blur parameter values are correlated with the amount of blur in the local input image regions in accordance with a particular model or visual representation of the blur in local input image regions. The resolution reduction module 18 produces multiple reduced-resolution blur models for each of the local input image regions (FIG. 6, block 56). For each of the local input image regions, the resolution reduction module 18 selects one of the blur models as the blur model representative of blur in the respective local input image region based on the corresponding blur parameter values (FIG. 6, block 58).

Figure 7:
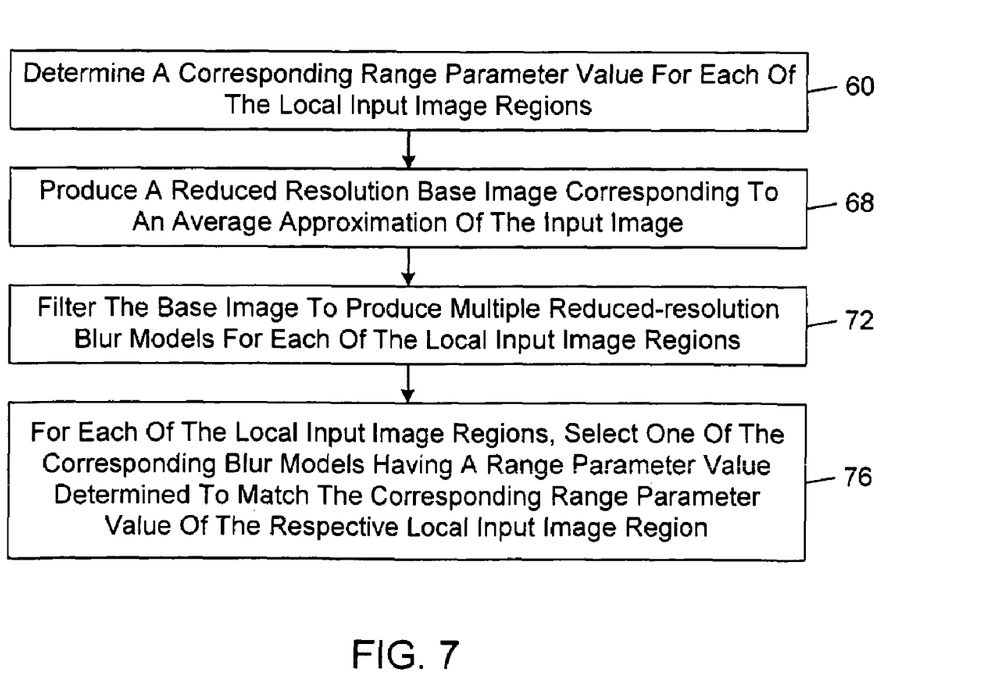
FIG. 7 is a flow diagram of an embodiment of the input image processing method of FIG. 6.
Figure 8:
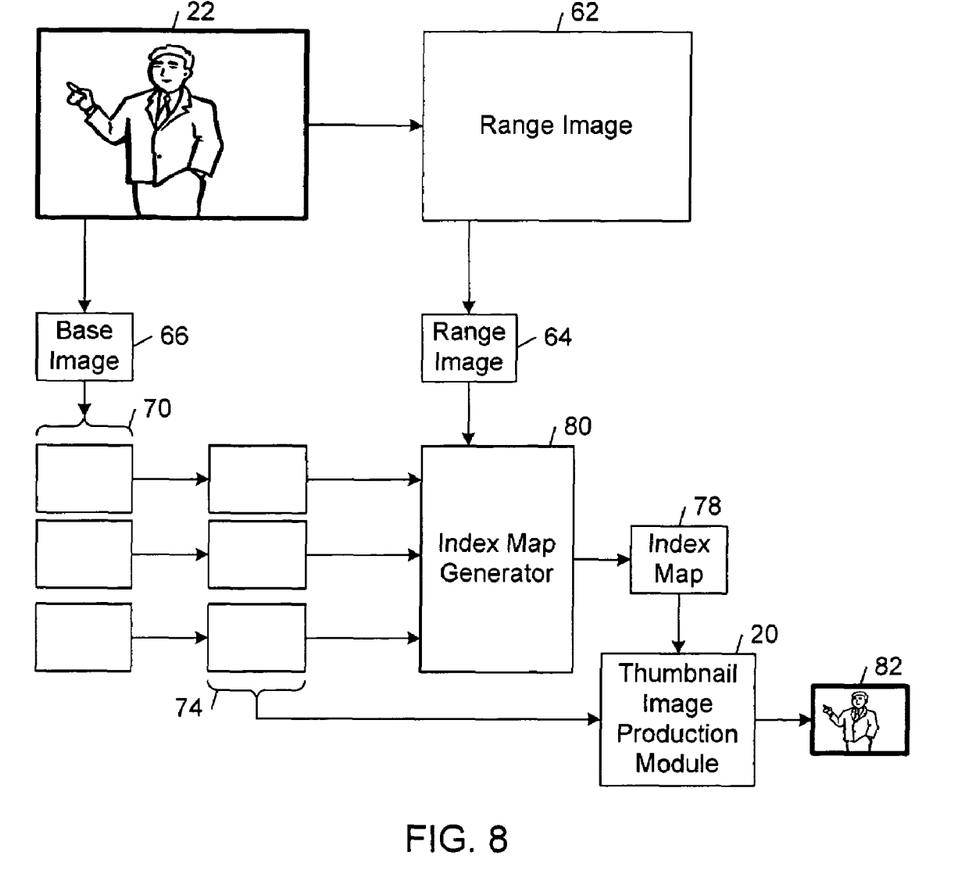
FIG. 8 is a flow diagram of information produced by an embodiment of the input image processing method of FIG. 7.

FIG. 7 shows an exemplary implementation of the blur modeling method of FIG. 6. FIG. 8 shows a flow diagram of information generated at various stages of this blur modeling method.

In accordance with the blur modeling method of FIG. 7, the input image processing system 10 determines a corresponding range parameter value for each of the local input image regions (FIG. 7, block 60). In some embodiments, the range parameter values measure the magnitude of absolute differences in the local input image regions. The magnitudes of absolute differences are correlated with the amount of blur in the local input image regions. In some of these embodiments, the visual feature analysis module 16 superimposes a sliding window over the input image 22 and determines the range parameter values in a range image 62 from the input image pixels within the sliding window. In one exemplary embodiment, the sliding window has dimensions of 3×3 pixels. Each range parameter value corresponds to the difference between the maximum luminance value and the minimum luminance value within the sliding window superimposed on a respective one of the local input image pixels. The resolution reduction module 18 generates a reduced-resolution range image 64 from the range image 62. In one exemplary embodiment, the resolution reduction module 18 calculates the maximum of the range image 62 (e.g., within 10×10 pixels if the size of the thumbnail is ten times smaller in each linear dimension) and down-samples the resulting non-linearly filtered range image to the target pixel resolution of the thumbnail image 24 to produce the reduced-resolution range image 64.

The resolution reduction module 18 produces a reduced-resolution base image 66 corresponding to an average approximation of the input image (FIG. 7, block 68). In some embodiments, the base image 66 corresponds to a standard image thumbnail that is produced by filtering the input image 22 with a low-pass filter (e.g., a boxcar filter) and down-sampling the filtered image to the target pixel resolution of the thumbnail image 24.

The resolution reduction module 18 filters the base image 66 with multiple blur filters to produce multiple reduced-resolution blur models 70 for each of the local input image regions (FIG. 7, block 72). In some embodiments in accordance with this method, the resolution reduction module 18 blurs the base image 66 with a set of blur filters to produce a scale-space of reduced-resolution blur models 70 each of which has local regions corresponding to reduced-resolution, blurred versions of respective ones of the local input image regions. In one exemplary embodiment, the blur filters are separable Gaussian blur filters that in both the horizontal and the vertical directions use the Gaussian distribution defined in equation (1) to transform the pixel values of the base image 66 into the blur images 70:

$$G(r)=ke^{-r^2/(2\sigma^2)} \quad (1)$$

where the filter coefficients are given by equation (1) for integer pixel offset values r and σ is the standard deviation of the Gaussian distribution. To ensure that the filter is normalized (sums to 1) for discrete filters, the normalization factor k is the reciprocal of the sum of all of the filter coefficients. In one exemplary embodiment, the standard deviation σ is varied from 0.5 to 2.5 to produce the blur models 70.

The resolution reduction module 18 determines a respective range map 74 from each of the blur images 70. In this process, the resolution reduction module 18 uses the same process that was used to determine the range image 62.

For each of the local input image regions, the resolution reduction module 18 selects one of the corresponding blur models 70 having a range parameter value that is determined to match the corresponding range parameter value of the respective local input image region (FIG. 7, block 76). In this process, the resolution reduction module 18 compares each of the range parameter values in the reduced-resolution range image 64 to the corresponding range parameter values in the range maps 74. The blur model 70 that is determined to have an associated range parameter value that matches the range parameter value of a corresponding pixel in the reduced-resolution range image 64 is identified in an index map 78 by an index map generator 80, which is a component of the resolution reduction module 18. In one exemplary embodiment, the index map generator 80 indexes the blur models with range parameter values that are just above the range parameter values of corresponding pixels in the reduced-resolution range image 64.

The resolution reduction module 18 synthesizes a reduced-resolution blur image 82 by selecting the pixel values from the blur models 70 in accordance with the index map 78. In some implementations, the reduced-resolution blur image 82 corresponds to the thumbnail image 24.

B. Modeling Noise in Local Input Image Regions

Figure 9:
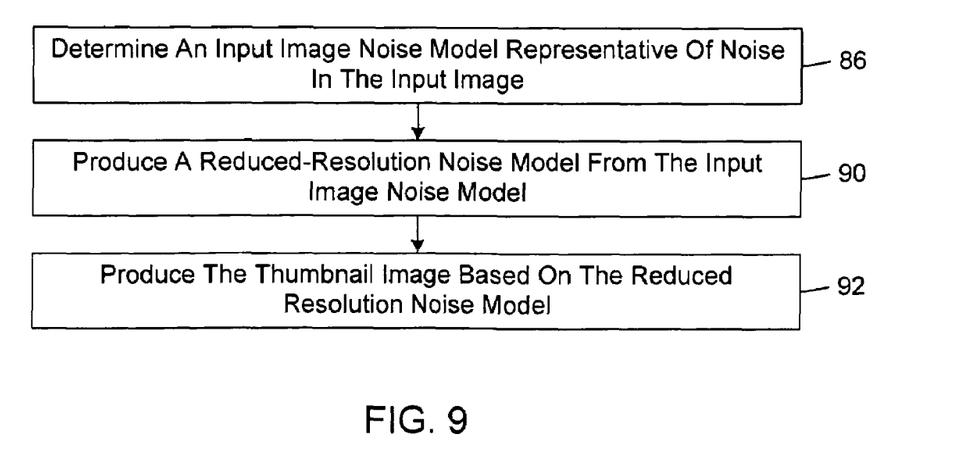
FIG. 9 is a flow diagram of an embodiment of an input image processing method.
Figure 10:
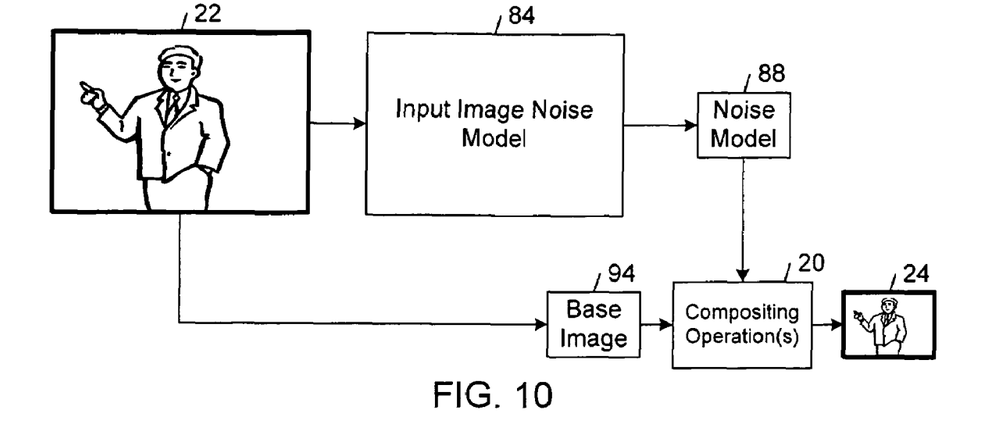
FIG. 10 is a flow diagram of information produced by an embodiment of the input image processing method of FIG. 9.

FIG. 9 shows an embodiment of a method by which the input image processing system 10 models noise in local regions of the input image 22. FIG. 10 shows a flow diagram of information generated at various stages of this noise modeling method.

In accordance with the noise modeling method of FIG. 9, the visual feature analysis module 16 determines an input image noise model 84 representative of noise in the input image 22 (FIG. 9, block 86). In some embodiments, the visual feature analysis module 16 derives the input image noise model 84 from estimates of the noise variance in the input image 22. In some of these embodiments, the input image noise model is generated by computing a high-pass filtered version the input image 22 and applying a soft threshold to the resulting high-pass filtered image, where the threshold is set based on a global estimate of the noise in the input image 22.

The resolution reduction module 18 produces a reduced-resolution noise model 88 from the input image noise model 84 (FIG. 9, block 90). In some embodiments, the resolution reduction module 18 produces the reduced-resolution noise model 88 by down-sampling the input image noise model 84 to the target pixel resolution level of the thumbnail image 24. In some of these embodiments, the resolution reduction module 18 sub-samples the input image noise model 84 on a jittered grid to produce the reduced-resolution noise model 88 (see, e.g., Robert L. Cook, "Stochastic Sampling in Computer Graphics," ACM Transactions on Graphics (TOG), Volume 5, Issue 1, pp. 51-72 (January 1986)).

The thumbnail image production module 20 produces the thumbnail image 24 based on the reduced-resolution noise model 88 (FIG. 9, block 92). In the illustrated embodiment, the thumbnail image production module 20 combines the reduced-resolution noise model 88 with a base image 94 to produce the thumbnail image 24. In some embodiments, the thumbnail image production module 20 adds the values of the pixels in the reduced-resolution noise model 88 to the values of corresponding pixels of the base image 94.

In some embodiments, the base image 94 corresponds to a standard thumbnail image that is produced by low-pass filtering and down-sampling the input image 22 to the target pixel resolution of the thumbnail image 24. In other embodiments, the base image 94 corresponds to a reduced-resolution version of the input image 22 that incorporates one or more reduced-resolution visual representations of corresponding ones of the local regions of the input image 22 in accordance with the embodiments described herein. For example, in one exemplary embodiment, the base image 94 corresponds to the reduced-resolution blur image 82 shown in FIG. 8.

Another method of generating the noise that has similar appearance to the noise in the input image involves estimating noise model parameters such as variance and spatial covariance from the input image, and then simulating a noise process that has these characteristic parameters by using filtered pseudo-random numbers.

C. Modeling Texture in Local Input Image Regions

Input images sometimes contain high spatial resolution textures. Because of their high spatial frequencies, it is impossible to accurately reflect the structures of the textures in the lower-resolution thumbnails. On the other hand, some particular aspects of the textures, such as the variations of the texture local energy, may be reflected in the lower-resolution thumbnails.

In some embodiments of the input image processing system 10, the visual feature analysis module 16 generates a local texture model, which may be represented as an image map. One method for generating the texture model is to first find areas of texture content by applying a local edge detector to the input image, and determining the edge density within local regions of the input image. Regions of high edge density are considered highly textured. This edge density map is multiplied by a high pass filtered version of the input image, to result in the texture model that approximates the high frequency textures. This map is input to the resolution reduction module 18 to generate a low resolution texture model that reflects the texture energy of the input image. In some of these embodiments, the low resolution texture energy model is generated by subsampling the image map on a jittered grid. In some embodiments, the low resolution texture model is input to the thumbnail production module 20, which adds the low resolution texture model to a base image. In some embodiments, the base image corresponds to a standard thumbnail image that is produced by low-pass filtering and down-sampling the input image 22 to the target pixel resolution of the thumbnail image 24. In other embodiments, the base image corresponds to a reduced-resolution version of the input image 22 that incorporates one or more reduced-resolution visual representations of corresponding ones of the local regions of the input image 22 in accordance with the embodiments described herein.

D. Modeling Colorfulness in Local Input Image Regions

Figure 11:
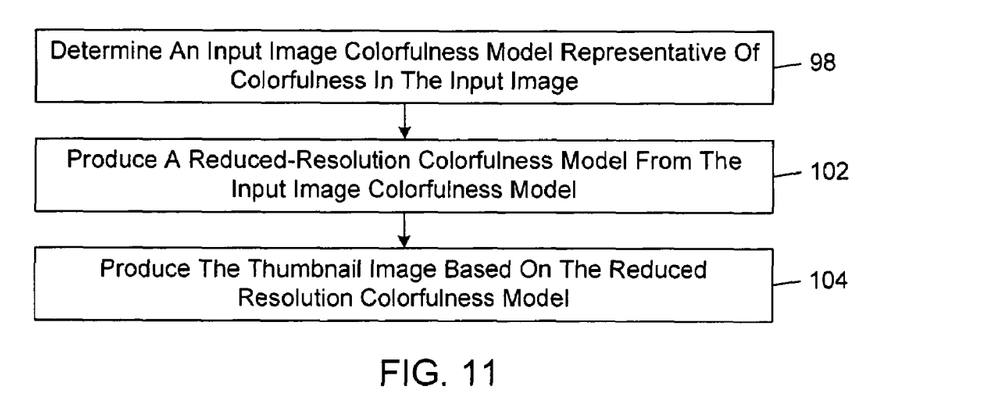
FIG. 11 is a flow diagram of an embodiment of an input image processing method.
Figure 12:
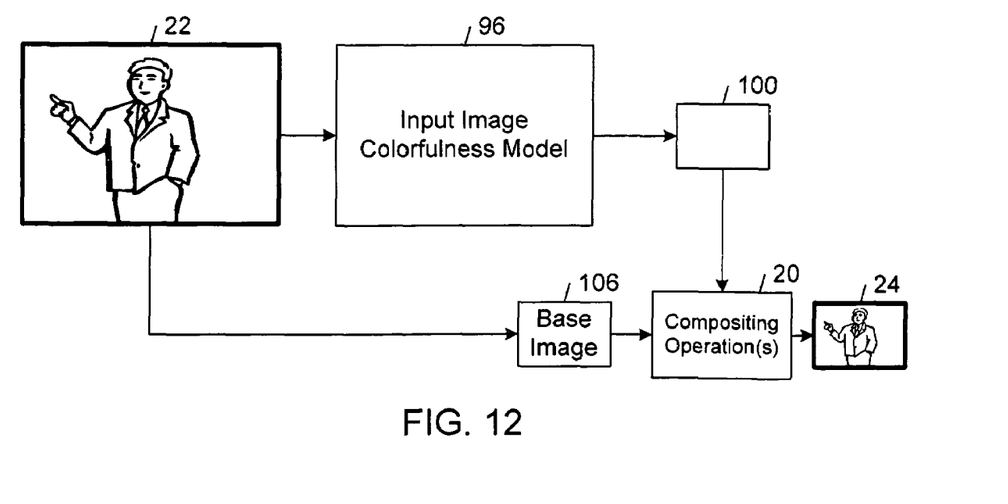
FIG. 12 is a flow diagram of information produced by an embodiment of the input image processing method of FIG. 11.

FIG. 11 shows an embodiment of a method by which the input image processing system 10 models colorfulness in local regions of the input image 22. FIG. 12 shows a flow diagram of information that is generated at various stages of this colorfulness modeling method.

In accordance with the colorfulness modeling method of FIG. 11, the visual feature analysis module 16 determines an input image colorfulness model 96 representative of the colorfulness in the input image 22 (FIG. 11, block 98). The appearance of colorfulness depends on the spatial patterns in which it appears (see, e.g., Poirson et al., "Pattern-Color Separable Pathways Predict Sensitivity to Simple Colored Patterns," Vision Research, Vol. 36, No. 4, pp. 515-526 (1996)). In some embodiments, the colorfulness of the input image colorfulness model 96 may be determined by the model described by Poirson et al., and the parameters for chrominance gains of the input image colorfulness model 96 may be adjusted to modify the color appearance.

The resolution reduction module 18 produces a reduced-resolution colorfulness model 100 from the input image colorfulness model 96 (FIG. 11, block 102). In some embodiments, the resolution reduction module 18 produces the reduced-resolution colorfulness model 100 by down-sampling the input image colorfulness model 96 to the target pixel resolution level of the thumbnail image 24.

The thumbnail image production module 20 produces the thumbnail image 24 based on the reduced-resolution colorfulness model 100 (FIG. 11, block 104). In the illustrated embodiment, the thumbnail image production module 20 combines the reduced-resolution colorfulness model 100 with a base image 106 to produce the thumbnail image 24. In general, the thumbnail image production module 20 combines the reduced-resolution colorfulness model 100 with the base image 106 in a way that modifies the pixels values of the base image 106 such that the local regions of the base image 106 have colorfulness measures that approximate the colorfulness measures of corresponding regions of the reduced-resolution colorfulness model 100.

In some embodiments, the base image 106 corresponds to a standard thumbnail image that is produced by low-pass filtering and down-sampling the input image 22 to the target pixel resolution of the thumbnail image 24. In other embodiments, the base image 106 corresponds to a reduced-resolution version of the input image 22 that incorporates one or more reduced-resolution visual representations of corresponding ones of the local regions of the input image 22 in accordance with the embodiments described herein. For example, in one exemplary embodiment, the base image 106 corresponds to the reduced-resolution blur image 82 shown in FIG. 8. In another exemplary embodiment, the base image 106 corresponds to the version of the thumbnail image 24 shown in FIG. 10.

E. Modeling Specular Highlights in Local Input Image Regions

Figure 13:
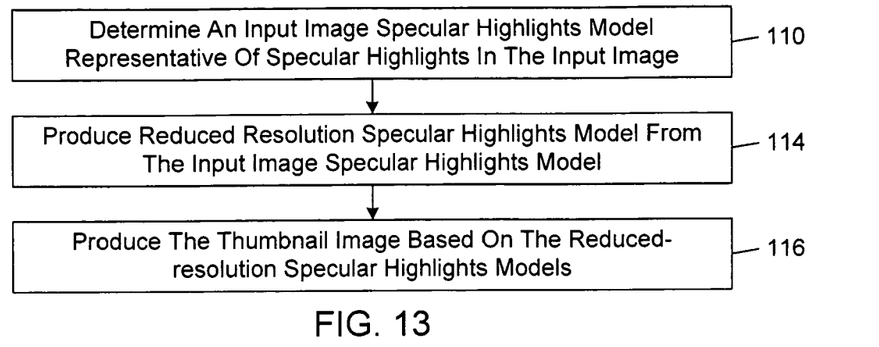
FIG. 13 is a flow diagram of an embodiment of an input image processing method.
Figure 14:
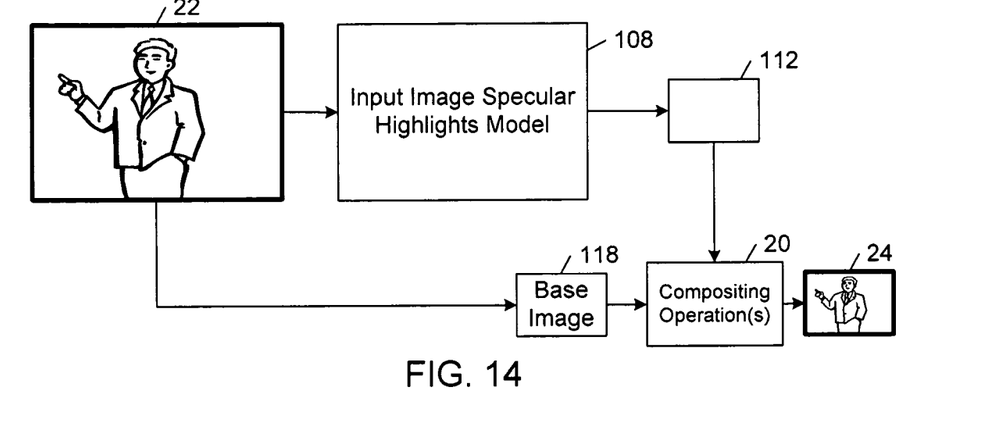
FIG. 14 is a flow diagram of information produced by an embodiment of the input image processing method of FIG. 13.

FIG. 13 shows an embodiment of a method by which the input image processing system 10 models specular highlights in local regions of the input image 22. FIG. 14 shows a flow diagram of information generated at various stages of this specular highlights modeling method.

In accordance with the specular highlights modeling method of FIG. 13, the visual feature analysis module 16 determines an input image specular highlights model 108 representative of the specular highlights in the input image 22 (FIG. 13, block 110). In general, the visual feature analysis module 16 may detect local regions of the input image 22 that contain specular highlights in accordance with any type of specular highlights detection method. In some embodiments, the input image specular highlights model is derived by first segmenting specular regions by automatically examining image color histograms for telltale highlight colors and highlight histogram shapes, and subsequently applying a morphological operator to adaptively grow the specular regions so that they will then be more visible in the thumbnail. In some embodiments, the resulting input image specular highlights model 108 corresponds to a mask that identifies local regions of the input image 22 that contain specular highlights.

The resolution reduction module 18 produces a reduced-resolution specular highlights model 112 from the input image specular highlights model 108 (FIG. 13, block 114). In some embodiments, the resolution reduction module 18 produces the reduced-resolution specular highlights model 112 by down-sampling the input image specular highlights model 108 to the target pixel resolution level of the thumbnail image 24.

The thumbnail image production module 20 produces the thumbnail image 24 based on the reduced-resolution specular highlights model 112 (FIG. 13 block 116). In the illustrated embodiment, the thumbnail image production module 20 combines the reduced-resolution specular highlights model 112 with a base image 118 to produce the thumbnail image 24. In general, the thumbnail image production module 20 combines the reduced-resolution specular highlights model 112 with the base image 118 in a way that modifies the pixels values of the base image 118 such that the local regions of the thumbnail image 24 have specular highlights that approximate the specular highlights in corresponding regions of the reduced-resolution specular highlights model 112. In some embodiments, the thumbnail image production module 20 may use one or more compositing operations to add artificial specular highlights to the base image 118 in accordance with the specular highlights model 112.

In some embodiments, the base image 118 corresponds to a standard thumbnail image that is produced by low-pass filtering and down-sampling the input image 22 to the target pixel resolution of the thumbnail image 24. In other embodiments, the base image 118 corresponds to a reduced-resolution version of the input image 22 that incorporates one or more reduced-resolution visual representations of corresponding ones of the local regions of the input image 22 in accordance with the embodiments described herein. For example, in one exemplary embodiment, the base image 118 corresponds to the reduced-resolution blur image 82 shown in FIG. 8. In another exemplary embodiment, the base image 118 corresponds to the version of the thumbnail image 24 shown in FIG. 10. In another exemplary embodiment, the base image 118 corresponds to the version of the thumbnail image 24 shown in FIG. 12.

F. Modeling Other Visual Features of Local Input Image Regions

1. Overview

In general, the input image processing system 10 may model any type of visual feature in the input image and produce an image thumbnail 24 that incorporates reduced-resolution visual representations of the modeled visual features in order to provide cues about the quality and contents of the input image 22.

Figure 15:
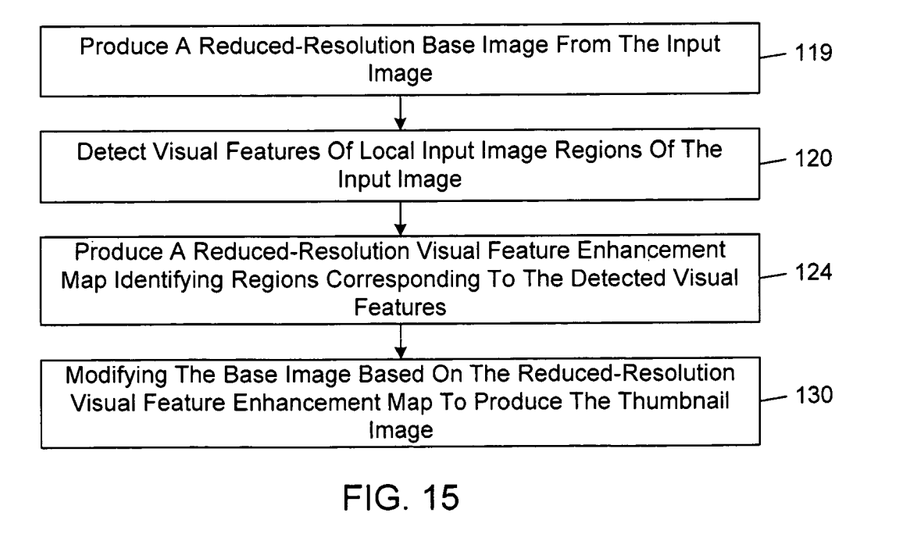
FIG. 15 is a flow diagram of an embodiment of an input image processing method.
Figure 16:
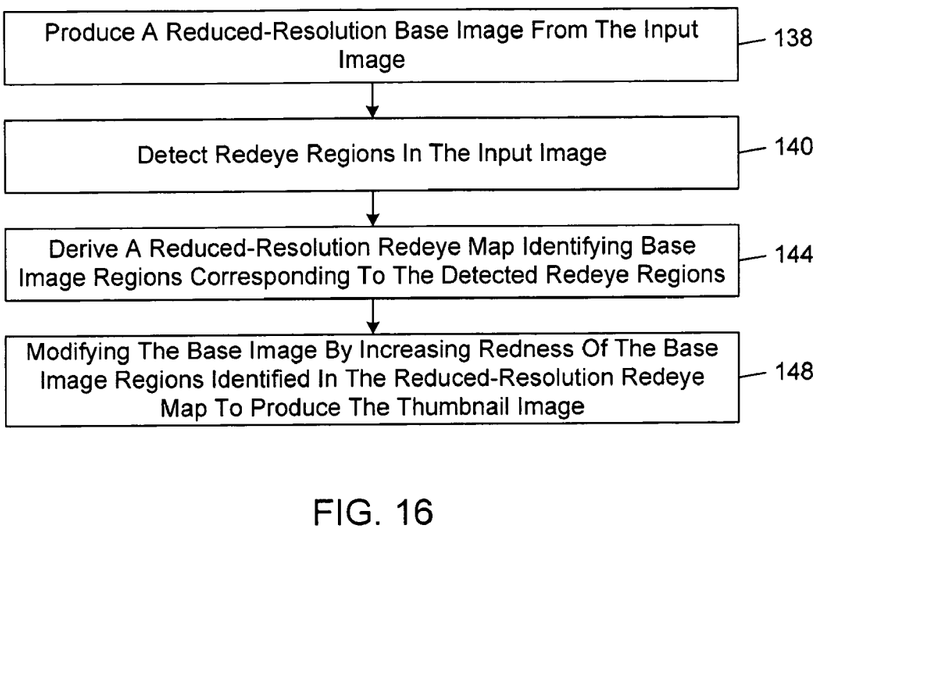
FIG. 16 is a flow diagram of an embodiment of an input image processing method.

FIG. 15 shows an embodiment of a method by which the input image processing system models visual features in local regions of the input image 22. FIG. 16 shows a flow diagram of information that is generated at various stages of this visual feature modeling method.

In accordance with the visual feature modeling method of FIG. 15, the resolution reduction module 18 produces a reduced-resolution base image 126 from the input image 22 (FIG. 15, block 119). In some embodiments, the base image 126 corresponds to a standard thumbnail image that is produced by low-pass filtering and down-sampling the input image 22 to the target pixel resolution of the thumbnail image 24. In other embodiments, the base image 126 corresponds to a reduced-resolution version of the input image 22 that incorporates one or more reduced-resolution visual representations of corresponding ones of the local regions of the input image 22 in accordance with the embodiments described herein. For example, the base image 118 may correspond to one of the reduced-resolution blur image 82 shown in FIG. 8 and the versions of the thumbnail image 24 shown in FIGS. 10, 12, and 14.

The visual feature analysis module 16 detects one or more visual features of local regions of the input image 22 (FIG. 15, block 120). Exemplary types of low-level visual features that may be detected and modeled by the visual feature analysis module 16 include: defocus; motion blur; local texture content that is above the nyquist frequency of the thumbnail sampling parameters; specular highlights; and noise. In some embodiments, the visual feature analysis module 16 detects and models visually significant high-level features, such as redeyes, faces and expressions and other objects of interest. A description of examples of methods of detecting and modeling specific types of visual features are provided in the next sections.

The resolution reduction module 18 produces a reduced-resolution visual feature enhancement map 122 identifying regions corresponding to the detected visual features (FIG. 15, block 124). In some embodiments, the resolution reduction module 18 produces the reduced-resolution visual feature enhancement map 122 from an input image visual feature map 126 that identifies the locations of the visual features detected by the visual feature analysis module 16 or contains a model of such visual features. In other embodiments, the resolution reduction module 18 derives the reduced-resolution visual feature enhancement map 122 directly from the input image 22. In this process, the resolution reduction module 18 uses information about the visual features that are detected by the visual feature analysis module 16.

The thumbnail image production module 20 modifies the base image 126 based on the reduced-resolution visual feature enhancement map 122 to produce the thumbnail image 24 (FIG. 15, block 130). In this process, the thumbnail image production module 20 modifies the pixels values of the base image 126 in accordance with the reduced-resolution visual feature enhancement map 122 such that the local regions of the thumbnail image 24 have visual features that approximate the visual features in corresponding ones of the local regions of the input image 22.

2. Modeling Redeyes in Local Input Image Regions

Figure 17:
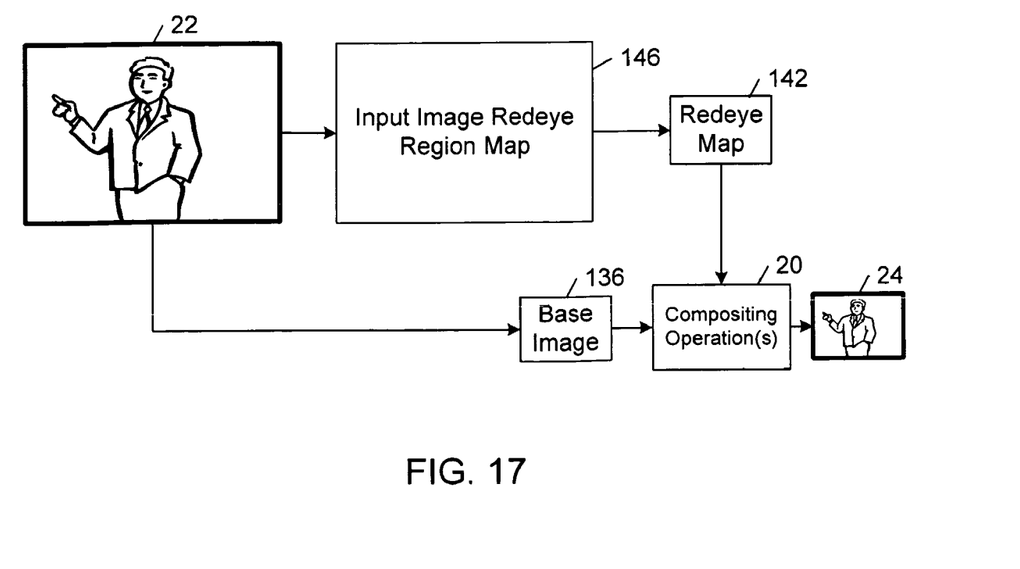
FIG. 17 is a flow diagram of information produced by an embodiment of the input image processing method of FIG. 16.

FIG. 16 shows an embodiment of a method by which the input image processing system 10 models redeyes in local regions of the input image 22. FIG. 17 shows a flow diagram of information generated at various stages of this redeye modeling method.

In accordance with the redeye modeling method of FIG. 16, the resolution reduction module 18 produces a reduced-resolution base image 136 from the input image 22 (FIG. 16, block 138). In some embodiments, the base image 136 corresponds to a standard thumbnail image that is produced by low-pass filtering and down-sampling the input image 22 to the target pixel resolution of the thumbnail image 24. In other embodiments, the base image 136 corresponds to a reduced-resolution version of the input image 22 that incorporates one or more reduced-resolution visual representations of corresponding ones of the local regions of the input image 22 in accordance with the embodiments described herein. For example, the base image 136 may correspond to one of the reduced-resolution blur image 82 shown in FIG. 8 and the versions of the thumbnail image 24 shown in FIGS. 10, 12, 14, and 16.

The visual feature analysis module 16 detects redeye regions in the input image 22 (FIG. 16, block 140). In general, any of a wide variety of different methods may be used by the visual feature analysis module 16 to detect redeye regions in the input image 22. In some embodiments the redeye detection method described in U.S. Pat. No. 7,116,820 is used to detect redeye regions in the input image 22.

The resolution reduction module 18 produces a reduced-resolution redeye map 142 identifying base image regions corresponding to the detected redeye regions (FIG. 16, block 144). In some embodiments, the resolution reduction module 18 produces the reduced-resolution redeye enhancement map 142 from an input image redeye region map 146 that identifies the locations of the redeye regions detected by the visual feature analysis module 16 or contains a model of such redeye regions. In other embodiments, the resolution reduction module 18 derives the reduced-resolution redeye map 142 directly from the input image 22. In this process, the resolution reduction module 18 uses information about the redeye regions that are detected by the visual feature analysis module 16.

The thumbnail image production module 20 modifies the base image 136 by increasing redness of the based image regions identified in the reduced-resolution redeye map 142 to produce the thumbnail image 24 (FIG. 16, block 148). In this process, the thumbnail image production module 20 modifies the pixels values of the base image 136 in accordance with the reduced-resolution redeye enhancement map 142 such that the local regions of the thumbnail image 24 have visible redeye regions corresponding to ones of the redeye regions detected in the input image 22.

G. Visualizing Regions of Interest in Thumbnail Images

1. Overview

In some embodiments, the input image processing system 10 is operable to identify one or more regions of interest in the input image 22 and to produce photo realistic thumbnail versions of the identified regions of interest to provide cues about the quality and contents of sub-regions of the input image 22.

Figure 18:
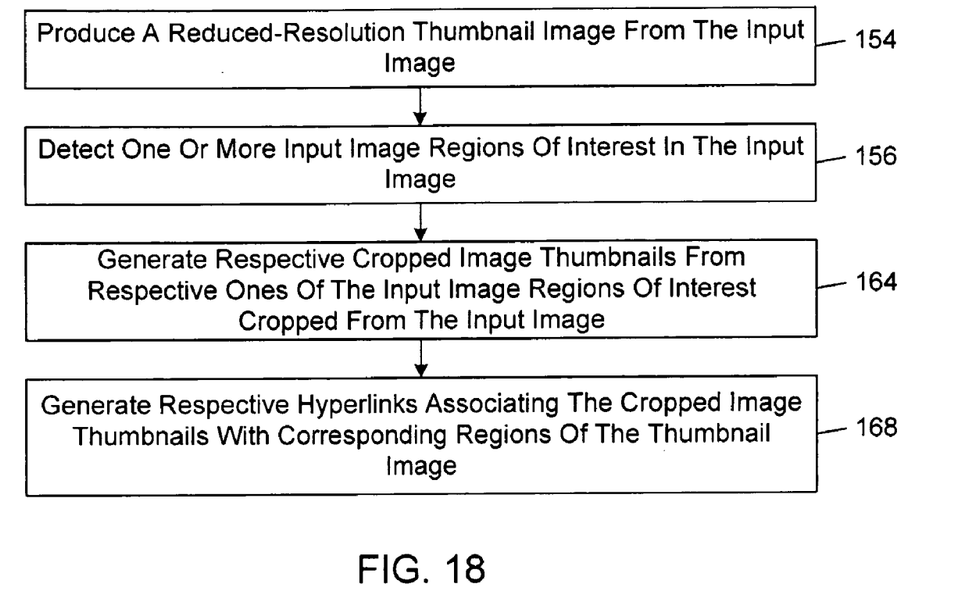
FIG. 18 is a flow diagram of an embodiment of an input image processing method.
Figure 19:
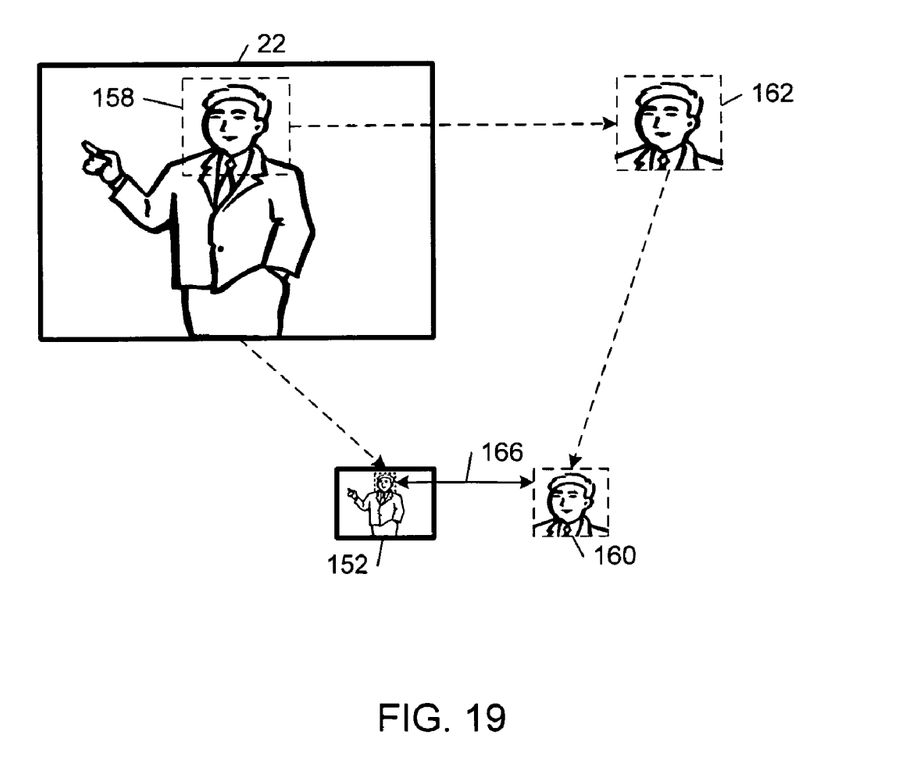
FIG. 19 is a flow diagram of information produced by an embodiment of the input image processing method of FIG. 18.

FIG. 18 shows an embodiment of a method by which the input image processing system 10 produces multiple thumbnail versions of the input image 22. FIG. 19 shows a flow diagram of information that is generated at various stages of this thumbnail image production method.

In accordance with the thumbnail image production method of FIG. 18, the input image processing system 10 produces a reduced-resolution thumbnail image 152 from the input image 22 (FIG. 18, block 154). In some embodiments, the thumbnail image 152 corresponds to a standard thumbnail image that is produced by low-pass filtering and down-sampling the input image 22 to the target pixel resolution. In other embodiments, the thumbnail image 152 corresponds to a reduced-resolution version of the input image 22 that incorporates one or more reduced-resolution visual representations of corresponding ones of the local regions of the input image 22 in accordance with the embodiments described herein. For example, the thumbnail image 152 may correspond to one of the reduced-resolution blur image 82 shown in FIG. 8 and the versions of the thumbnail image 24 shown in FIGS. 10, 12, 14, 16, and 18.

The visual feature analysis module 16 detects one or more regions of interest in the input image 22 (FIG. 18, block 156).

In general, the visual feature analysis module 16 may be configured to detect any type of visually significant, important or salient region, object, or other region of interest in the input image. In some embodiments, regions of interest are identified based on a selected perceptual or attention model. Exemplary regions of interest include non-background regions, objects (e.g., persons), and faces. In the illustrated embodiment, the visual feature analysis module 16 detects regions 158 of the input image 22 containing faces. Exemplary methods of detecting faces in the input image 22 are described in the next section.

The input image processing system 10 generates respective cropped image thumbnails 160 from respective ones of the input image regions of interest 162 that are cropped from the input image 22 (FIG. 18, block 164). In this process, the input image processing system 10 crops each of the identified regions of interest 158 from the input image 22 to produce a respective cropped image 162. The regions of interest typically are cropped to bounding boxes that are identified by the visual feature analysis module 16. The input image processing system 10 then produces the cropped image thumbnails 160 from the cropped images 162. In some embodiments, each of the cropped image thumbnails 160 corresponds to a standard thumbnail image that is produced by low-pass filtering and down-sampling the corresponding cropped images 162 to the target pixel resolution. In other embodiments, each of the cropped image thumbnails 160 corresponds to a reduced-resolution version of the corresponding cropped image 162 that incorporates one or more reduced-resolution visual representations of corresponding ones of the local regions of the cropped image 162 in accordance with the embodiments described herein.

The input image processing system 10 generates respective hyperlinks 166 associating the cropped image thumbnails 160 with corresponding regions of the thumbnail image 152 (FIG. 18, block 168). In some embodiments, a graphical user interface displays the cropped image thumbnails 160 in response to the passing of a virtual pointer (e.g., a cursor) over the corresponding hyperlinked regions of the thumbnail image 152.

2. Detecting Faces in the Input Image

In general, the visual feature analysis module 16 may use any type of face detection process that determines the presence and location of each face in the input image 22. Exemplary face detection methods include but are not limited to feature-based face detection methods, template-matching face detection methods, neural-network-based face detection methods, and image-based face detection methods that train machine systems on a collection of labeled face samples. An exemplary feature-based face detection approach is described in Viola and Jones, "Robust Real-Time Object Detection," Second International Workshop of Statistical and Computation theories of Vision—Modeling, Learning, Computing, and Sampling, Vancouver, Canada (Jul. 13, 2001), which is incorporated herein by reference. An exemplary neural-network-based face detection method is described in Rowley et al., "Neural Network-Based Face Detection," IEEE Transactions on Pattern Analysis and Machine Intelligence, Vol. 20, No. 1 (January 1998), which is incorporated herein by reference.

In a typical face detection process, the visual feature analysis module 16 initially determines the presence and rough location of each face the input image 22. After the rough location of a face has been detected, the visual feature analysis module 16 aligns (or registers) the detected face so that it can be recognized. In this process, one or more feature points in the detected face (e.g., the eyes, the nose tip, and the mouth or lips) are extracted. In general, any type of feature extraction process may be used including but not limited to edge, line and curve based feature extraction methods, extraction methods based on templates that are designed to detect specific features points (e.g., the eyes and mouth), and structural matching methods. For each detected face, the visual feature analysis module 16 aligns the extracted features in relation to a respective facial bounding box encompassing some or all portions of the detected face. In some implementations, the facial bounding box corresponds to a rectangle that includes the eyes, nose, mouth but not the entire forehead or chin or top of head of a detected face.

V. Conclusion

The embodiments that are described herein are capable of producing photorealistic image thumbnails that provide improved representations of the quality of the corresponding original images. In this way, these embodiments enable users to accurately ascertain the quality of the original images. This information may be used, for example, to select which images in a collection to incorporate into a photo album, print as a hardcopy, send to others by electronic mail, and delete from a collection.

Other embodiments are within the scope of the claims.

What is claimed is:

1. A method, comprising:
analyzing respective visual features of local input image regions of an input image having a first pixel resolution to produce a result, wherein the analyzing comprises determining a corresponding blur parameter value for each of the local input image regions;
based on the result of analyzing the visual features, deriving from the input image reduced-resolution visual representations of corresponding ones of the local input image regions, wherein the deriving comprises determining respective reduced-resolution blur models representative of blur in the local input image regions based on the corresponding blur parameter values and, for each of the local input image regions: determining multiple reduced-resolution blur models, and selecting one of the blur models as the blur model representative of blur in the respective local input image region based on the corresponding blur parameter values;
producing from the reduced-resolution visual representations a thumbnail image that reflects the arrangements, proportions and local details of the input image having a second pixel resolution lower than the first pixel resolution; and
outputting the thumbnail image.

2. The method of claim 1, wherein the deriving comprises low-pass filtering the input image to produce a filtered image, sub-sampling the filtered image to produce a reduced resolution base image, and filtering the reduced resolution base image to determine the blur models.

3. The method of claim 1, wherein the analyzing comprises determining an input image noise model representing noise in the input image, and the deriving comprises producing a reduced-resolution noise model from the input image noise model.

4. The method of claim 3, wherein the producing comprises sub-sampling the input image noise model on a jittered grid to produce the reduced-resolution noise model.

5. The method of claim 3, wherein: the deriving comprises low-pass filtering the input image to produce a filtered image, and sub-sampling the filtered image to produce a reduced resolution base image; and the producing comprises combining the noise model with the reduced resolution base image to produce the thumbnail image.

6. The method of claim 1, wherein the deriving comprises low-pass filtering the input image to produce a filtered image, sub-sampling the filtered image to produce a reduced resolution base image, and deriving the reduced-resolution visual representations from the reduced resolution base image.

7. The method of claim 1, wherein each of the reduced-resolution visual representations corresponds to a respective texture model of a respective one of the local input image regions.

8. The method of claim 1, wherein each of the reduced-resolution visual representations corresponds to a respective colorfulness model of a respective one of the local input image regions.

9. The method of claim 1, wherein each of the reduced-resolution visual representations corresponds to a respective specular highlights model of a respective one of the local input image regions.

10. The method of claim 1, wherein the analyzing comprises detecting redeye regions in the input image and the deriving comprises deriving a reduced-resolution enhancement map identifying base image regions corresponding to the detected redeye regions, and the modifying comprises increasing redness of the identified base image regions.

11. The method of claim 1, further comprising detecting one or more input image regions of interest in the input image, wherein the deriving comprises generating respective cropped image thumbnails from respective ones of the input image regions of interest cropped from the input image, and further comprising generating respective hyperlinks associating the cropped image thumbnails with corresponding regions of the thumbnail image.

12. A system, comprising:
a memory storing processor-readable instructions;
a processor coupled to the memory, operable to execute the instructions, and based at least in part on the execution of the instructions operable to perform operations comprising
analyzing respective visual features of local input image regions of an input image having a first pixel resolution to produce a result, wherein the analyzing comprises determining a corresponding blur parameter value for each of the local input image regions;
deriving from the input image reduced-resolution visual representations of corresponding ones of the local input image regions based on the result of analyzing the visual features, wherein the deriving comprises determining respective reduced-resolution blur models representative of blur in the local input image regions based on the corresponding blur parameter values and, for each of the local input image regions: determining multiple reduced-resolution blur models, and selecting one of the blur models as the blur model representative of blur in the respective local input image region based on the corresponding blur parameter values;
producing from the reduced-resolution visual representations a thumbnail image that reflects the arrangements, proportions and local details of the input image having a second pixel resolution lower than the first pixel resolution; and
outputting the thumbnail image.

13. The system of claim 12, wherein the visual feature analysis data processing component is operable to determine an input image noise model representing noise in the input image, and the resolution reduction data processing component is operable to produce a reduced-resolution noise model from the input image noise model.

14. The system of claim 12, wherein the resolution reduction data processing component is operable to low-pass filter the input image to produce a filtered image, sub-sample the filtered image to produce a reduced resolution base image, and derive the reduced-resolution visual representations from the reduced resolution base image.

15. The system of claim 12, wherein the visual feature analysis data processing component is operable to detect one or more input image regions of interest in the input image, the resolution reduction data processing component is operable to generate respective cropped image thumbnails from respective ones of the input image regions of interest cropped from the input image, and the thumbnail image production data processing component is operable to generate respective hyperlinks associating the cropped image thumbnails with corresponding regions of the thumbnail image.

16. The system of claim 12, wherein the resolution reduction data processing component is operable to derive reduced-resolution visual representations of respective ones of the local input image regions in accordance with at least one model selected from: a texture model; a colorfulness model; and a specular highlights model.

17. A non-transitory machine-readable medium storing machine-readable instructions causing a machine to perform operations comprising:
analyzing respective visual features of local input image regions of an input image having a first pixel resolution to produce a result, wherein the analyzing comprises determining a corresponding blur parameter value for each of the local input image regions;
based on the result of analyzing the visual features, deriving from the input image reduced-resolution visual representations of corresponding ones of the local input image regions, wherein the deriving comprises determining respective reduced-resolution blur models representative of blur in the local input image regions based on the corresponding blur parameter values and, for each of the local input image regions: determining multiple reduced-resolution blur models, and selecting one of the blur models as the blur model representative of blur in the respective local input image region based on the corresponding blur parameter values;
producing from the reduced-resolution visual representations a thumbnail image that reflects the arrangements, proportions and local details of the input image having a second pixel resolution lower than the first pixel resolution; and
outputting the thumbnail image.

18. The method of claim 1, wherein the determining comprises:
determining a corresponding range parameter value for each of the local input image regions;
producing a reduced resolution base image corresponding to an average approximation of the input image;

filtering the base image to produce multiple reduced resolution blur models for each of the local input regions; and for each of the local input image regions, selecting one of the corresponding blur models having a range parameter value determined to match the corresponding range parameter value of the respective local input image region.

19. The method of claim 18, wherein the range parameter values measure magnitude of absolute differences of image values in the local image regions.

20. The method of claim 1, wherein the analyzing, the deriving, the producing, and the outputting are performed by a computer system.

* * * * *